United States Patent
Palmero et al.

(10) Patent No.: US 11,818,006 B2
(45) Date of Patent: Nov. 14, 2023

(54) ENVIRONMENTAL SUSTAINABILITY OF NETWORKING DEVICES AND SYSTEMS

(71) Applicant: Cisco Technology, Inc., San Jose, CA (US)

(72) Inventors: Maria Soledad Palmero, Toledo (ES); Esther Roure Vila, Alpicat Lleida (ES); Ranjani Ram, Chapel Hill, NC (US); Saumya Dubey, Karnataka (IN); Snezana Mitrovic, Leefdaal (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/583,834

(22) Filed: Jan. 25, 2022

(65) Prior Publication Data

US 2023/0239211 A1    Jul. 27, 2023

(51) Int. Cl.
*H04L 41/0833*    (2022.01)
*H04L 41/0823*    (2022.01)

(52) U.S. Cl.
CPC ...... *H04L 41/0833* (2013.01); *H04L 41/0836* (2013.01)

(58) Field of Classification Search
None
See application file for complete search history.

(56) References Cited

U.S. PATENT DOCUMENTS

| | | | |
|---|---|---|---|
| 10,535,022 B1 | 1/2020 | Hood et al. | |
| 2004/0044476 A1 | 3/2004 | Miyamoto et al. | |
| 2010/0274629 A1 | 10/2010 | Walker et al. | |
| 2011/0320054 A1* | 12/2011 | Brzezowski | G06Q 50/06 700/291 |
| 2013/0134962 A1* | 5/2013 | Kamel | G06Q 10/06312 324/103 R |
| 2013/0290511 A1* | 10/2013 | Tu | G06F 9/5072 709/224 |
| 2013/0346247 A1 | 12/2013 | Bash et al. | |
| 2014/0012552 A1 | 1/2014 | Zik | |
| 2014/0236680 A1 | 8/2014 | Chen et al. | |
| 2017/0052886 A1 | 2/2017 | Pillai et al. | |

(Continued)

OTHER PUBLICATIONS

Ecovadis, Ecovadis.com, retrieved Nov. 16, 2021, 4 pages.

(Continued)

*Primary Examiner* — Mohamed Ibrahim
(74) *Attorney, Agent, or Firm* — Edell, Shapiro & Finnan, LLC

(57) ABSTRACT

Techniques are provided for improving the environmental sustainability of a networking device and/or a networking system. In one example, a sustainability server obtains power consumption data of a networking device on a per-plane basis. Based on the power consumption data, the sustainability server computes an individual sustainability score that indicates a level of environmental sustainability of the networking device. The sustainability server further analyzes the power consumption data on the per-plane basis. In response to analyzing the power consumption data on the per-plane basis, the sustainability server provides a recommendation to implement a change to a configuration or operating parameter of the networking device, or to a networking system that includes the networking device, to improve the individual sustainability score.

20 Claims, 9 Drawing Sheets

(56) References Cited

U.S. PATENT DOCUMENTS

| | | | |
|---|---|---|---|
| 2021/0027401 A1 | 1/2021 | Hovhannisyan et al. | |
| 2021/0225529 A1* | 7/2021 | Viengkham | G16Y 20/10 |
| 2022/0327538 A1* | 10/2022 | Kumar | G06Q 20/401 |

OTHER PUBLICATIONS

"Certified Remanufactured Equipment," Cisco, https://www.cisco.com/c/en/us/products/remanufactured.html, retrieved Nov. 16, 2021, 13 pages.
"Cisco Product Takeback and Reuse," Cisco, https://www.cisco.com/c/en/us/about/takeback-and-reuse.html, retrieved Nov. 16, 2021, 6 pages.
"Project 15 Open Platform IoT sustainability," Azure Solution Ideas, https://docs.microsoft.com/en-us/azure/architecture/solution-ideas/articles/project-15-iot-sustainability, retrieved Nov. 16, 2021, 8 pages.
"Routers DE-UZ 160," Blue Angel The German Ecolabel, Version 3, Jan. 2018, 23 pages.
Naomi Scott-Mearns, "Ecolabel criteria development for Network Equipment," One Planet network, https://www.oneplanetnetwork.org/knowledge-centre/resources/ecolabel-criteria-development-network-equipment, Dec. 18, 2018, 5 pages.
Nicholas Dodd, et al., "JRC Science for Policy Report—Development of the EU Green Public Procurement (GPP) Criteria for Data Centres, Server Rooms and Cloud Services," European Commission, Joint Research Centre, EUR 30251 EN, 2020, 130 pages.
Joseph Fiksel, et al., "Measuring Product Sustainability," The Journal of Sustainable Product Design, Battelle Memorial Institute, Jul. 1998, 16 pages.
"Cisco Energy Management as a Service User Guide," Cisco, Release 5.2, Jul. 2016, 307 pages.
"Cisco Energy Management User Guide," Cisco, Release 5.1, Dec. 2015, 295 pages.
"Save Energy in the Campus or Distributed Office," Cisco, White Paper, Dec. 2014, 5 pages.
"See the Power: Achieve Plug Load Visibility with Enterprise Energy Management," Cisco, White Paper, Nov. 2014, 4 pages.
"Gaining Energy Transparency and Efficiency in the Data Center," Cisco, White Paper, Nov. 2014, 6 pages.
"Bridging the Gap between Facilities and IT to Reduce Energy Costs across the Enterprise," Cisco, White Paper, Nov. 2014, 4 pages.
"Cisco Energy Management Suite," Cisco, Data Sheet, Jan. 2015, 4 pages.
Georgia Lykou, et al., "A new methodology toward effectively assessing data center sustainability," Dec. 2017, 23 pages.
Robert Tozer, et al., "Data Center Sustainability Index," American Society of Heating, Refrigerating, and Air-Conditioning Engineers, Inc. (ASHRAE) Conference Papers, https://www.thefreelibrary.com/_/print/PrintArticle.aspx?id=537720462, Jan. 1, 2018, 9 pages.
"Forwarding plane," Wikipedia, https://en.wikipedia.org/wiki/Forwarding_plane, Oct. 11, 2021, 6 pages.
"Data plane," Wikipedia, https://en.wikipedia.org/wiki/Data_plane, Apr. 13, 2021, 2 pages.
"Control plane," Wikipedia, https://en.wikipedia.org/wiki/Control_plane, Dec. 4, 2021, 5 pages.
"Management plane," Wikipedia, https://en.wikipedia.org/wiki/Management_plane, Feb. 21, 2018, 1 page.
Ivan Pepelnjak, "Management, Control, and Data Planes in Network Devices and Systems," Building network automation solutions, https://blog.ipspace.net/2013/08/management-control-and-data-planes-in.html, Aug. 13, 2013, updated Nov. 18, 2020, 8 pages.
Bill Gartner, "Optics in the Data Center: Powering Ever-Increasing Capacity Demands," Cisco Blogs, https://blogs.cisco.com/sp/optics-in-the-data-center-powering-ever-increasing-capacity-demands, Jul. 24, 2019, 5 pages.
Bill Gartner. "Data Center Interconnect: Trends, Transitions and How Cisco's Intent to Acquire Acacia Is a Game Changer for the Future of DCI Technology," Cisco Blogs, https://blogs.cisco.com/sp/data-center-interconnect-trends-transitions-and-how-ciscos-intent-to-acquire-acacia-is-a-game-changer-for-the-future-of-dci-technology, Jul. 16, 2019, 7 pages.
Romain Tavenard, "Getting started," tslearn 0.5.2 documentation, https://tslearn.readthedocs.io/en/stable/gettingstarted.html, retrieved Dec. 31, 2021, 2 pages.
"STUMPY," STUMPY documentation, 1.10.2, https://stumpy.readthedocs.io/en/latest/, retrieved Dec. 31, 2021, 7 pages.
"Welcome to sktime," https://www.sktime.org/en/stable/, retrieved Dec. 31, 2021, 1 page.
"Cisco Energy Efficient Data Center Solutions and Best Practices," Cisco, White Paper, Jul. 2007, 17 pages.
"Tips for Improving Your Cisco UCS Power Efficiency," Cisco, White Paper, Feb. 2015, 12 pages.
"Red Eléctrica launches a new app to follow the decarbonisation of the electricity system in Spain in real time," Red Electrica de España, Nov. 24, 2020, 2 pages.
"Greenhouse Gases Equivalencies Calculator—Calculations and References," United Stated Environmental Protection Agency, retrieved Jan. 3, 2022, 29 pages.
Jennifer Boynton, "Energy efficiency of Cisco products," Cisco, Cisco Blogs, https://blogs.cisco.com/csr/energy-efficiency-of-cisco-products, Jun. 22, 2020, 9 pages.
Vemula Dinesh Reddy, et al., "Metrics for Sustainable Data Centers," IEEE Transactions on Sustainable Computing, vol. 2, No. 3, https://www.researchgate.net/publication/317560905_Metrics_for_Sustainable_Data_Centers, Jul.-Sep. 2017, 15 pages.
Lizhe Wang, et al., "Review of performance metrics for green data centers: a taxonomy study," The Journal of Supercomputing, Mar. 2011, 19 pages.
A. Bierman, et al., RESTCONF Protocol, Internet Engineering Task Force (IETF), Request for Comments: 8040, Category: Standards Track, ISSN: 2070-1721, Jan. 2017, 137 pages.
R. Enns, et al., "Network Configuration Protocol (NETCONF)," Internet Engineering Task Force (IETF), Request for Comments: 6241, Obsoletes: 4741, Category: Standards Track, ISSN: 2070-1721, 113 pages.
"UN Sustainable Development Goals," Cisco ESG Reporting Hub, https://www.cisco.com/c/m/en_us/about/csr/esg-hub/governance/frameworks/unsdg.html, retrieved Jan. 3, 2022, 13 pages.
"Technical Guidance for Calculating Scope 3 Emissions," Greenhouse Gas Protocol, Version 1.0, Apr. 25, 2013, 182 pages.

* cited by examiner

ENVIRONMENTAL SUSTAINABILITY OF NETWORKING DEVICES AND SYSTEMS

TECHNICAL FIELD

The present disclosure relates to computer networking.

BACKGROUND

Environmental sustainability relates to the concept of conserving natural resources, ecosystems, and the environment generally. Increasingly, companies are facing immense pressure to improve the transparency of their sustainability practices. As a result, sustainability can be an essential consideration for businesses.

DESCRIPTION OF EXAMPLE EMBODIMENTS

Overview

Techniques are provided herein for improving the environmental sustainability of a networking device and/or a networking system. In one example embodiment, a sustainability server obtains power consumption data of a networking device on a per-plane basis. Based on the power consumption data, the sustainability server computes an individual sustainability score that indicates a level of environmental sustainability of the networking device. The sustainability server further analyzes the power consumption data on the per-plane basis. In response to analyzing the power consumption data on the per-plane basis, the sustainability server provides a recommendation to implement a change to a configuration or operating parameter of the networking device, or to a networking system that includes the networking device, to improve the individual sustainability score.

Example Embodiments

Figure 1:
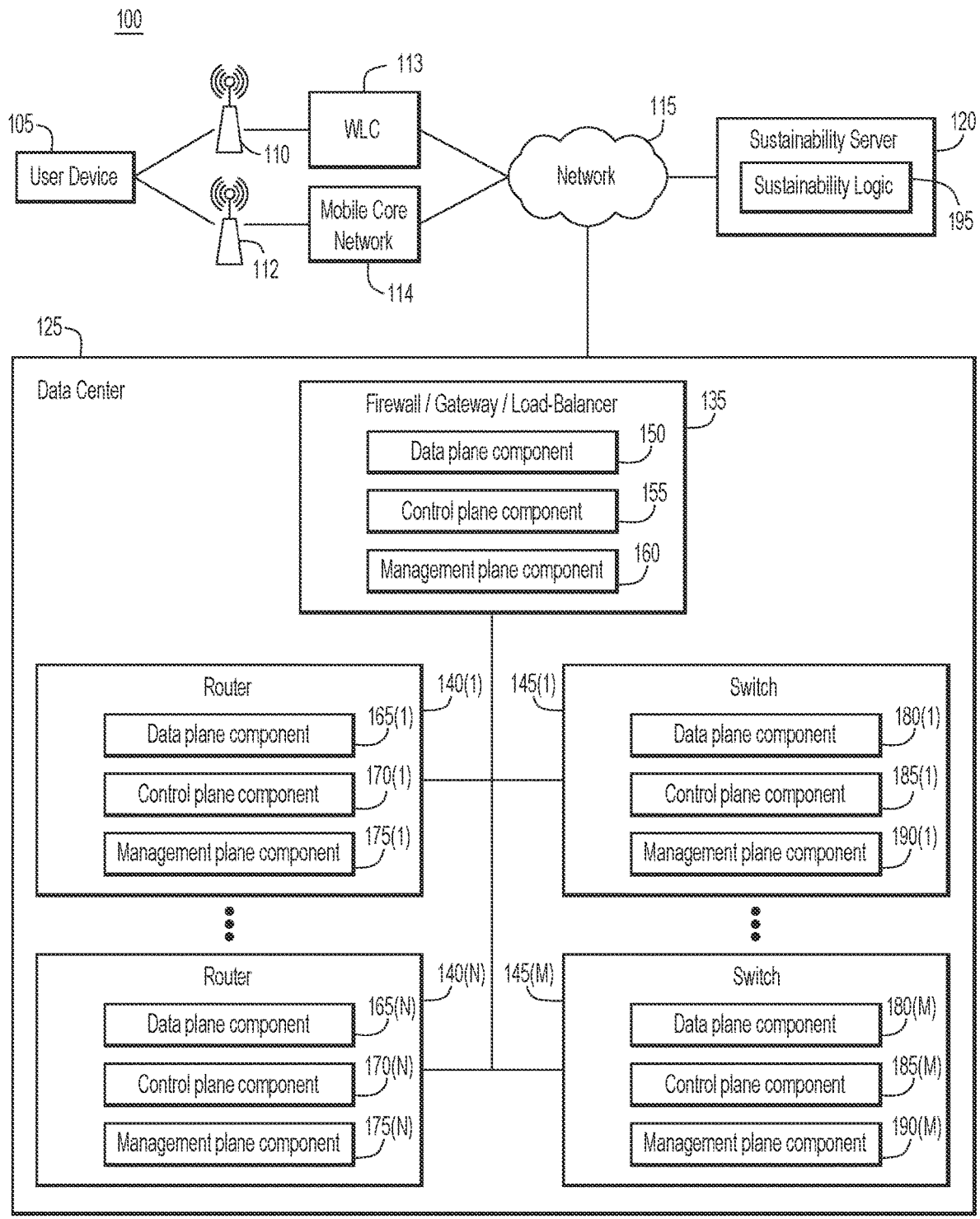
FIG. 1 illustrates a networking system configured to improve the environmental sustainability of the networking system and/or of one or more networking devices in the networking system, according to an example embodiment.

FIG. 1 illustrates a networking system 100 configured to improve the environmental sustainability of networking system 100 and/or of one or more networking devices in networking system 100, according to an example embodiment. Networking system 100 includes user device 105, Access Point (AP) 110, cellular radio unit 112, Wireless Local Area Network (LAN) Controller (WLC) 113, mobile core network 114, network 115, and sustainability server 120, and data center 125. Data center 125 includes a plurality of networking devices, including firewall/gateway/load-balancer 135, routers 140(1)-140(N), and switches 145(1)-145(M).

User device 105 may include a computer, an enterprise device, a Personal Digital Assistant (PDA), a laptop, an electronic notebook, a cellular telephone, a smartphone, a tablet, and/or any other device and/or combination of devices, components, elements, and/or objects. User device 105 may also include any suitable interface to a human user such as a microphone, a display, a keyboard, or other terminal equipment. User device 105 may be configured with appropriate hardware (e.g., processor(s), memory element(s), antennas and/or antenna arrays, baseband processors (modems), and/or the like), software, logic, and/or the like to facilitate respective over-the-air (air) interfaces for accessing/connecting to AP 110. User device 105 may be configured to access/connect to AP 110 via Wireless Local Area Network (WLAN) (e.g., Wi-Fi®) and/or to cellular radio unit 112 via cellular (e.g., 4G Long-Term Evolution (LTE) or 5G New Radio (NR)) technology.

AP 110 may be a WLAN AP configured with appropriate hardware (e.g., processor(s), memory element(s), antennas and/or antenna arrays, baseband processors (modems), and/or the like), software, logic, and/or the like to provide over-the-air coverage for a WLAN access network (e.g., a Wi-Fi network). In various embodiments, AP 110 may be implemented as Wi-Fi APs and/or the like. AP 110 may be configured over-the-air coverage for a private WLAN access network.

Cellular radio unit 112 may terminate a cellular air interface and may be configured with appropriate hardware (e.g., processor(s), memory element(s), antennas and/or antenna arrays, baseband processors (modems), and/or the like), software, logic, and/or the like to provide over-the-air coverage for a cellular access network (e.g., a 4G or 5G network). In various embodiments, cellular radio unit 112 may be implemented as any combination of an evolved Node B (eNB) to facilitate 4G LTE air access, a next generation Node B (gNB) to facilitate 5G NR air access, a next generation (nG) radio to facilitate any next generation air access, a Citizens Broadband Radio Service (CBRS) Device (CBSD) to facilitate CBRS access, and/or the like now known or hereafter developed.

Cellular radio unit 112 may provide over-the-air coverage for a private WLAN or cellular access network (e.g., private Wi-Fi, private 4G LTE, private 5G NR, private CBRS, etc.). The private access network may provide network connectivity/services to clients (e.g., user device 105) served by a network operator and/or service provider of the private access network, such as an enterprise. In one example, a private access network may be considered to be a network that may be implemented to serve enterprise purposes (e.g., business purposes, government purposes, educational purposes, etc.) for enterprise clients (e.g., enterprise users/devices/etc.) in which the private access network may be operated by any combination of traditional mobile network operators/service providers, enterprises network operators/service providers, and/or third party network operators/service providers (e.g., neutral host network operators/service providers, cloud service providers, etc.). While FIG. 1 depicts AP 110 and cellular radio unit 112 as separate entities, it will be appreciated that AP 110 and cellular radio unit 112 may be converged as a single entity configured to provide any combination of WLAN and cellular accesses.

WLC 113 may be configured to manage AP 110 and facilitate WLAN (e.g., Wi-Fi) connections via AP 110. Mobile core network 114 may be configured to manage cellular radio unit 112 and facilitate cellular (e.g., 4G or 5G) connections via cellular radio unit 112. While FIG. 1 depicts WLC 113 and mobile core network 114 as separate entities, it will be appreciated that WLC 113 and mobile core network 114 may be converged as a single entity configured to provide any combination of WLAN and cellular management services.

Network 115 may be any suitable private or public network configured to connect user device 105 (via AP 110 and/or cellular radio unit 112) with data center 125. In one example, network 115 may be a private enterprise network configured for access by users associated with an enterprise. In another example, network 115 may be a public network such as the Internet. Network 115 may include multiple networks, such as both private and public networks.

In one specific example, AP 110 and/or cellular radio unit 112 are configured to provide over-the-air coverage for a private WLAN or cellular access network, and network 115 is a private enterprise network. In this example, network 115 may include user device 105, AP 110, cellular radio unit 112, WLC 113, mobile core network 114, and/or data center 125, and data center 125 may be configured to perform storage and compute operations on behalf of the enterprise. Sustainability server 120 may be located in network 115 or remotely (e.g., in the cloud).

Data center 125 may be an on-premise data center or a remote data center (e.g., located in the cloud). In addition to firewall/gateway/load-balancer 135, routers 140(1)-140(N), and switches 145(1)-145(M), data center 125 may include other networking devices. For example, data center 125 may include servers configured to perform storage and compute operations. Additionally/alternatively, data center 125 may include optical fibers configured to connect firewall/gateway/load-balancer 135, routers 140(1)-140(N), and switches 145(1)-145(M). In one example, the networking devices in data center 125 may be manufactured, shipped, and/or installed by a single vendor.

Firewall/gateway/load-balancer 135 may be configured to perform firewall security operations, gateway translation operations, and/or load-balancer distribution operations. While FIG. 1 depicts firewall/gateway/load-balancer 135 as a single, integrated component, firewall/gateway/load-balancer 135 may include disparate components or devices. For example, firewall/gateway/load-balancer 135 may be one firewall device, one gateway device, and one load-balancer device. Or firewall/gateway/load-balancer 135 may be one firewall device and one gateway/load-balancer device. Other embodiments may be envisioned.

Firewall/gateway/load-balancer 135, routers 140(1)-140(N), and switches 145(1)-145(M) each include data plane components, control plane components, and management plane components. More specifically, firewall/gateway/load-balancer 135 includes data plane component 150, control plane component 155, and management plane component 160; routers 140(1)-140(N) include data plane components 165(1)-165(N), control plane components 170(1)-170(N), and management plane components 175(1)-175(N); and switches 145(1)-145(M) include data plane components 180(1)-180(M), control plane components 185(1)-185(M), and management plane components 190(1)-190(M).

As used herein, the term "data plane component" may refer to a component of a networking device that is configured to perform data plane operations. A data plane (also known as a "forwarding plane" or "user plane") refers to a part of the networking device architecture responsible for forwarding network communications (e.g., packet/frames). Specific examples of data plane components (e.g., data plane component 150, data plane components 165(1)-165(N), and data plane components 180(1)-180(M)) may include Central Processing Units (CPUs), Application-Specific Integrated Circuits (ASICs), Network Processing Units (NPUs), line cards, optics components (such as pluggable optics and/or optical transceivers), etc.

The term "control plane component" may refer to a component of a networking device that is configured to perform control plane operations. A control plane refers to a part of the networking device architecture responsible for how and where the data plane forwards the network communications. A specific example of control plane components (e.g., control plane component 155, control plane components 170(1)-170(N), and control plane components 185(1)-185(M)) may include CPUs.

The term "management plane component" may refer to a component of a networking device that is configured to perform management plane operations. A management plane refers to a part of the networking device architecture responsible for communicating with a network management entity configured to configure and monitor the networking device. For example, the management plane component may be configured to communicate with the network management entity using Model-Driven Telemetry (MDT) via any suitable protocol such as Network Configuration Protocol (NETCONF), RESTCONF, etc. A specific example of management plane components (e.g., management plane component 160, management plane components 175(1)-175(N), and management plane components 190(1)-190(M)) may include CPUs.

Monitoring the environmental sustainability of a networking device can be a highly complex task. The power/energy consumption of a given networking device can vary greatly depending on the specific functions that the networking device performs, and how the networking device implements those functions. For example, the power consumption of a networking device can depend on the compute actions performed by the networking device (if any), the type of interface (e.g., physical interface) used to transport packets, the network protocol(s) for which the networking device is configured, the type of routing, etc. This problem compounds for a networking system, which can include hundreds or even thousands of different networking devices.

Accordingly, to monitor and improve the environmental sustainability of a networking device and/or system, sustainability logic 195 is provided on sustainability server 120. In one example, sustainability server 120 may obtain power consumption data of a networking device (e.g., AP 110, firewall/gateway/load-balancer 135, routers 140(1)-140(N), switches 145(1)-145(M), one or more servers, etc.), and analyze the power consumption data, on a per-plane basis.

That is, for a given networking device, sustainability server 120 may obtain data indicating the power consumed by a data plane component, a control plane component, and/or a management plane component. By analyzing the power consumption data on a per-plane basis, sustainability server 120 may monitor—and even improve—the environmental sustainability of the networking device.

In a further example, based on the power consumption data, sustainability server 120 may compute an individual sustainability score that indicates a level of environmental sustainability of the networking device. The individual sustainability score may be a user-accessible, numerical value that indicates the environmental impact of a networking device. For instance, sustainability server 120 may provide the individual sustainability score to a network administrator of data center 125.

The individual sustainability score may provide all-encompassing, easy to consume, actionable data to help enterprises achieve sustainability goals. In one example, in response to analyzing the power consumption data on a per-plane basis, sustainability server 120 may provide a recommendation to implement a change to a configuration or operating parameter of the networking device, or to a networking system that includes the networking device, to improve the individual sustainability score.

Sustainability server 120 may also monitor and improve the environmental sustainability of networking system 100 (e.g., for a plurality of networking devices). To that end, for each networking device, sustainability server 120 may obtain power consumption data on a per-plane basis, analyze the power consumption data on a per-plane basis, and compute an individual sustainability score. Based on the individual sustainability score for each networking device, sustainability server 120 may compute a global sustainability score that indicates a level of environmental sustainability of networking system 100. In response to analyzing the power consumption data for each networking device on a per-plane basis, sustainability server 120 may provide a recommendation to implement a change to a configuration or operating parameter of one or more of the networking devices, or to networking system 100, to improve the global sustainability score.

It will be appreciated that the techniques described herein may be compatible with networking system 100 or any other suitable networking system. For example, while networking system 100 includes AP 110, in other examples, user device 105 may be connected to network 115 via a wire. Furthermore, while firewall/gateway/load-balancer 135, routers 140(1)-140(N), and switches 145(1)-145(M) are located in data center 125, the techniques described herein may apply to networking devices in any suitable location/configuration (e.g., the networking devices need not necessarily be part of a data center).

Techniques described herein may apply to any suitable networking devices that have data plane components, control plane components, and/or management plane components, such as firewalls, gateways, load-balancers, routers, switches, Internet of Things (IoT) devices, APs, servers, etc. The networking devices need not necessarily include each of a data plane component, control plane component, and management plane component. The networking devices may be hardware, software (e.g., virtual), and/or a combination of hardware and software.

Figure 2:
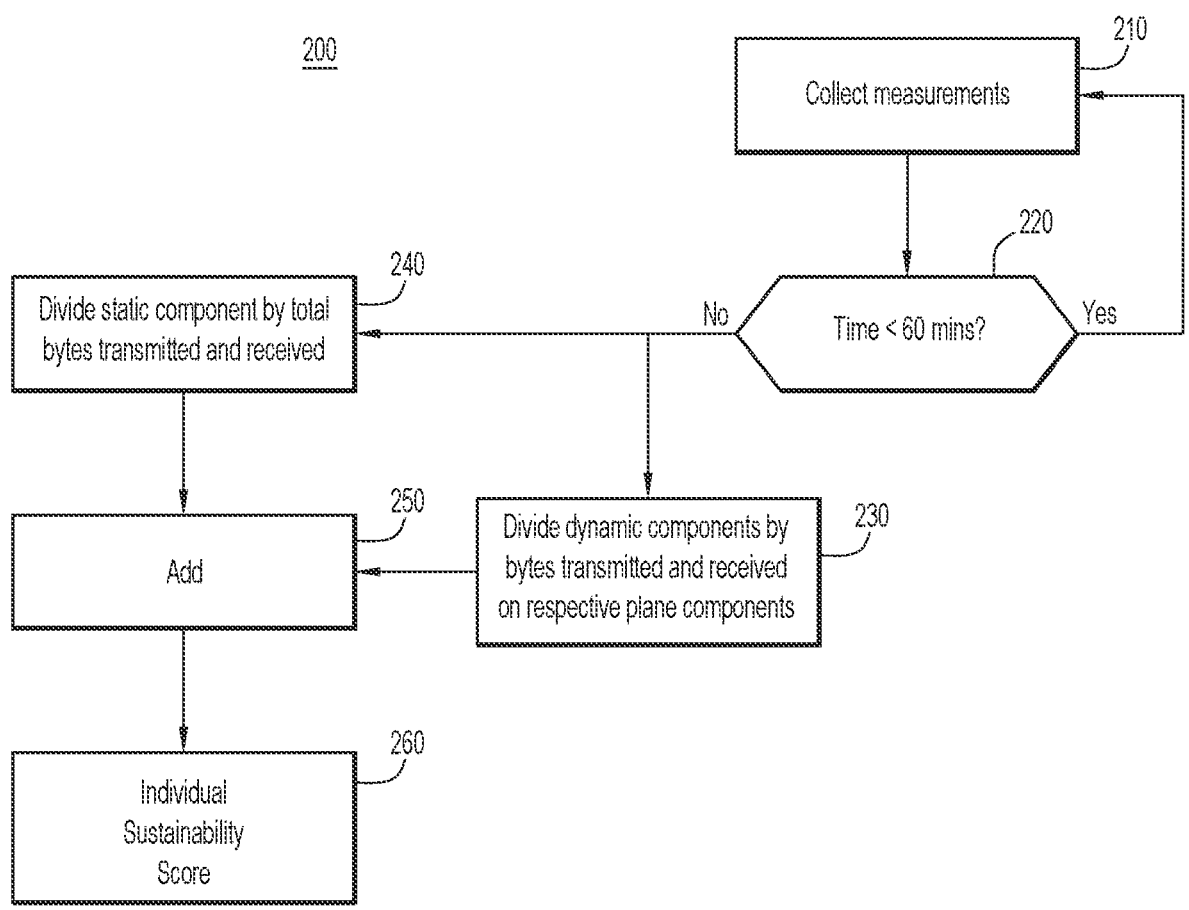
FIG. 2 illustrates a flowchart of a method for computing an individual sustainability score that indicates a level of environmental sustainability of a networking device, according to an example embodiment.

With continuing reference to FIG. 1, FIG. 2 illustrates a flowchart of a method 200 for computing an individual sustainability score that indicates a level of environmental sustainability of a networking device, according to an example embodiment. Initially, at operations 210 and 220, sustainability server 120 may obtain power consumption data of a networking device (e.g., one of firewall/gateway/load-balancer 135, routers 140(1)-140(N), or switches 145(1)-145(M)) on a per-plane basis.

More specifically, at operation 210, a collector may collect measurements (e.g., telemetry data/readings) from the networking device. The measurements may include power consumption data and/or interface counters or other indicators of the plane and component that consumed the power. For example, the measurements may indicate that a given amount of power was consumed in a management plane CPU, a control plane CPU, or in a data plane CPU, ASIC, or physical interface (e.g., an optics component).

The networking device may stream/transport the measurements to the collector via MDT. The networking device may transport the measurements periodically (e.g., once every thirty seconds), and the collector may accumulate the measurements periodically (e.g., once per minute).

The collector may be located on or remote from sustainability server 120. If remote, the collector may provide the measurements to sustainability server 120 when the measurements are received (e.g., once every thirty seconds), when the measurements are accumulated (e.g., once every minute), or after a collection period has expired (e.g., once every hour). Regardless of whether the collector is located on or remote from sustainability server 120, sustainability server 120 may obtain power consumption data on a per-plane basis. For example, sustainability server 120 may obtain power consumption data of one or more data plane components (e.g., one or more optics components) of the networking device, one or more control plane components of the networking device, and/or one or more management plane components of the networking device.

A specific example of collected measurements is provided as follows. In this example, the unit of power is mW and may be represented in dBm. The scale of conversion may be −10 dBm to 0.1 mW.

From Control Plane Component

```
{
"Timestamp": 1616651029143,
"Keys": {
"location": "0/RSP0",
"pem": "0/RSP0"
},
"Content": {
"card-type": {
"value": "0/RSP0"
},
"pem-id": {
"value": "A99-RSP-SE"
},
"power-allocated": 350,
"power-consumed": {
"value": "268"
},
```

Corresponding Bytes Transmitted and Received for the Same Time Period

```
"Timestamp": 1616651029655,
"Keys": {
"interface-name": "MgmtEth0/RSP0/CPU0/0"
},
"Content": {
"applique": 0,
"availability-flag": 0,
```

-continued

```
"broadcast-packets-received": 6003,
"broadcast-packets-sent": 0,
"bytes-received": 2224666,
"bytes-sent": 5712806,
```

From Data Plane CPU or ASIC:

```
{
"Timestamp": 1616651029215,
"Keys": {
"location": "0/FC0",
"pem": "0/FC0"
},
"Content": {
"card-type": {
"value": "0/FC0"
},
"pem-id": {
"value": "A99-SFC-S"
},
"Power-allocated": 95,
"Power-consumed": {
"value": "43"
},
```

Corresponding Bytes Transmitted and Received for the Same Time Period

```
{
"Timestamp": 1616651029655,
"Keys": {
"interface-name": "HundredGigE0/2/0/0"
},
"Content": {
"applique": 0,
"Availability-flag": 0,
"Broadcast-packets-received": 0,
"Broadcast-packets-sent": 0,
"Bytes-received": 1327519,
}
```

From data plane optics component:

```
{
"Timestamp": 1616651093026,
"Keys": {
"name": "Optics0/2/0/1"
},
"Content": {
"alarm-detected": "true",
"Derived-optics-type": "100G CPAK SR4"
"Display-volt-temp": "true",
"dwdm-carrier-band": "c-band",
receive-power": -10,
"transmit-power": -10
}
```

At operation 220, the collector determines whether an elapsed time is less than the collection period (e.g., one hour). If so, the collector continues collecting measurements, and if not, the collector proceeds to operations 230 and 240. Thus, the collector may aggregate the power consumed (and data transmitted and received) over the course of the collection period (e.g., one hour) before proceeding to operations 230 and 240.

At operation 230, based on the measurements, sustainability server 120 divides one or more dynamic components of the individual sustainability score by the bytes transmitted and received on the respective plane component(s). The dynamic components may include, for the collection period: (1) power consumed by management plane components; (2) power consumed by control plane components; and (3) power consumed by data plane components. Accordingly, sustainability server 120 may divide (1) the power consumed by management plane components by the total bytes transmitted and received by the management plane components; (2) the power consumed by control plane components by the total bytes transmitted and received by the control plane components; and/or (3) the power consumed by data plane components by the total bytes transmitted and received by the data plane components.

Thus, for each plane component (e.g., interface, ASIC, CPU, etc.), sustainability server 120 may divide the power consumed by the traffic (e.g., data bytes) transported within the same time interval (collection period). The result may represent the power consumed by the respective plane components to transport a byte of data.

Before, during, or after performing operation 230, sustainability server 120 may perform operation 240. At operation 240, sustainability server 120 divides a static (or nearly static) component of the individual score by the total bytes transmitted and received by the networking device (e.g., total bytes transmitted and received by the management, control, and data plane components of the networking devices). The static component may include one or more of the power consumed by a manufacturing process, a shipping/transport process, or an installation process for the networking device.

In one example, the power consumed may be amortized over some period of time (e.g., seven years). As a result, the static component may be computed as an amortized equipment cost per hour. For example, the static component may be equal to (power consumed by the manufacturing process+power consumed by the shipping process+power consumed by the installation process)/(assumed equipment lifetime in hours). Sustainability server 120 may calculate the static component when prompted, or may obtain the static component as a pre-set value.

At operation 250, sustainability server 120 may add outputs of operations 230 and 240 to compute the individual sustainability score. In one example, the individual sustainability score may be calculated as DPF+CPF+MPF+AM, where DPF is the data plane power consumed/data handled (e.g., including optics power consumed/data handled), CPF is the control plane power consumed/data handled, MPF is the management plane power consumed/data handled, and AM=amortized equipment cost/hour/data handled. The data handled may be equal to the bytes received/hour+bytes transmitted/hour. In this example, DPF, CPF, and MPF may be outputs of operation 230, and AM may be an output of operation 240.

At operation 260, sustainability server 120 arrives at the individual sustainability score. The individual sustainability score may indicate the sustainability (e.g., the physical environmental impact) of a product or technology (e.g., networking device). In one example, the smaller the individual sustainability score, the more sustainable (e.g., environmentally friendly) the product. As the data handled by the networking device increases, the sustainability score may decrease. As a result, if the networking device experiences short bursts of packets that cause a CPU of the networking device to consume a large amount of power, the individual sustainability score may be high even though the data handled over the course of the collection period may be relatively small. Thus, the individual sustainability score may capture the inefficiencies of a networking device without necessarily penalize a networking device for being heavily used.

Sustainability server 120 may compute the individual sustainability score of a networking device at different instances (e.g., for multiple collection periods). The individual sustainability score may change based on the overall configuration of a networking device or networking devices in networking system 100. For instance, a more complex configuration may place a greater burden on a CPU of the networking device. In one specific example, an increase in the number of "hellos" in Bidirectional Forwarding Detection (BFD) to msecs may impact the power in many areas, such as CPUs, ASICs, optics, etc. Thus, the individual sustainability score may vary across collection periods based on the power consumed and packets transported during the collection periods.

Sustainability server 120 may compute the individual sustainability score based on one or more factors (e.g., independent variables) in addition or alternative to the static and dynamic components discussed above. The factors may include: whether input power/electricity supplied to the networking device is provided by a green source; the age, type, and use of the networking device; the location (e.g., country) of the networking device (since the conversion from $CO_2$ emissions to kilowatts per hours can be computed differently in different countries); power consumption per byte; levels of network traffic at different times; time of day/week/month/year/etc.; the circular economy factors (the "5Rs": recycle, reuse, reduce, refuse, and repurpose); Business Unit (BU); manufacturing process; global and local regulatory compliances; etc.

Sustainability server 120 may analyze the power consumption data on a per-plane basis and, in response, provide a recommendation to implement a change to a configuration or operating parameter of the networking device, or to a networking system that includes the networking device, to improve the individual sustainability score. In one example, the networking device may monitor the power consumed by various components of the networking device and determine whether the networking device is consuming power beyond some threshold. The threshold may be a percentage of rated power (e.g., 70% or 75%), as rated in manufacturing and in accordance with local regulations.

When the consumed power exceeds the threshold, sustainability server 120 may perform the analysis; when the consumed power is below the threshold, sustainability server 120 may refrain from performing the analysis. Thus, the threshold may effectively limit the number of networking devices that are subject to the analysis, allowing sustainability server 120 to avoid wasting computing resources on analyzing networking devices whose individual sustainability scores are already acceptable (e.g., networking devices whose consumed power is below the threshold).

If the consumed power exceeds the threshold, sustainability server 120 may perform a time series analysis on the telemetry data of the networking device. The time series analysis may reveal whether and how the sustainability of the networking device changes over time. For example, sustainability server 120 may determine whether the networking device impacts the environment differently at different times (e.g., at different times of the day, the week, the month, the year, etc.). Sustainability server 120 may perform the time series analysis on a per-plane basis. For example, before performing the time series analysis, sustainability server 120 may split the power consumption data based on the data, control, and management plane components (e.g., CPU, ASIC, optical interface, etc.). Sustainability server 120 may then perform the time series analysis on each plane (e.g., on each grouping of component(s) corresponding to a given plane).

Figure 3:
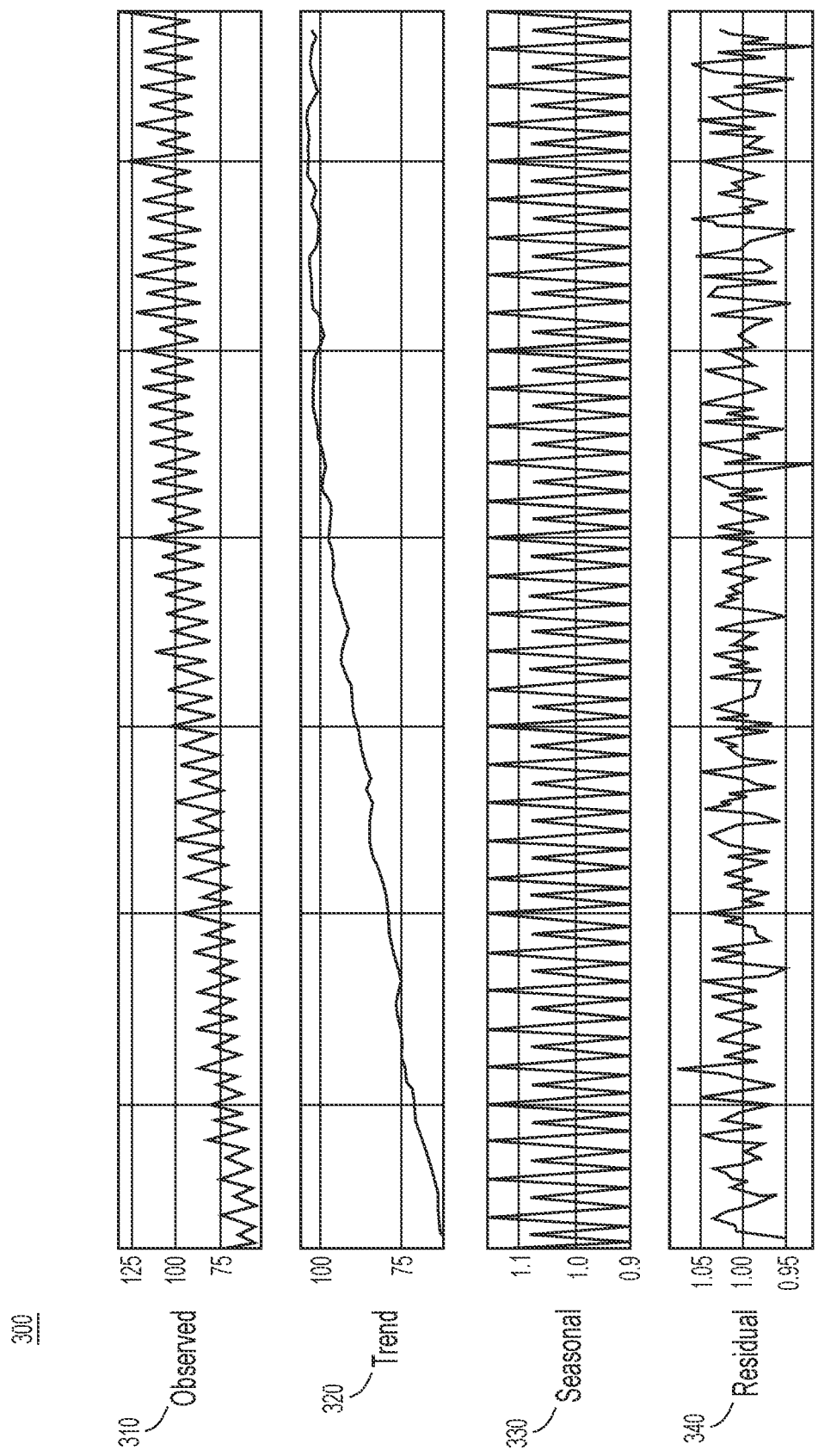
FIG. 3 illustrates a collection of graphs that show the results of an analysis of the power consumption of a networking device over time, according to an example embodiment.

With continuing reference to FIG. 1, FIG. 3 illustrates a collection of graphs 300 that show the results of an analysis of the power consumption of a networking device over time, according to an example embodiment. The results may be for a specific plane (e.g., one of a data, control, or management plane) of the networking device. Graphs 300 include observed power consumption graph 310, power consumption trend graph 320, seasonal power consumption graph 330, and residual power consumption graph 340.

Observed power consumption graph 310 shows the total power consumed by a specific plane of the networking device over time. Power consumption trend graph 320, seasonal power consumption graph 330, and residual power consumption graph 340 may each show a portion of the total power consumed. Thus, adding the data shown in the power consumption trend graph 320, seasonal power consumption graph 330, and residual power consumption graph 340 may reproduce observed power consumption graph 310.

Power consumption trend graph 320 shows an overall pattern or direction (if any) of the power consumption of the specific plane of the networking device. In this example, the power consumption trend graph 320 shows an overall upward trend, meaning that the networking device has been consuming more and more power over time. Seasonal power consumption graph 330 shows one or more periodic variations in the power consumption of the specific plane of the networking device. For example, the networking device may consume more power during the day than at night, or during the weekdays rather than during the weekends. Residual power consumption graph 340 shows remaining (e.g., random) power consumption of the specific plane of the networking device.

Sustainability server 120 may perform a time series analysis on the power consumption data shown in observed power consumption graph 310 to compute/determine the trend, seasonality, and residual data shown in power consumption trend graph 320, seasonal power consumption graph 330, and residual power consumption graph 340. The time series analysis may reveal whether there is any upward or downward trend or seasonality in power consumption for the networking device. In this example, the specific plane of the networking device is experiencing an upward trend in power consumption. Sustainability server 120 may perform the time series analysis using any suitable techniques, such as via open source software.

In response to the analysis, sustainability server 120 may provide a recommendation to implement a change to a configuration or operating parameter of the networking device, or to a networking system that includes the networking device, to improve the individual sustainability score of the networking device. For instance, based on the analysis, sustainability server 120 may predict a future power consumption trend of the networking device (e.g., predict when the networking device will reach 100% of the rated power). The recommendations may be intended to reverse an upward trend in power consumption.

In one example, sustainability server 120 may provide feedback for a user to improve the power consumption of the networking device. In another example, sustainability server 120 may implement the change to the configuration or operating parameter of the networking device or to the networking system to improve the individual sustainability score. Thus, the recommendation(s) may be implemented manually (e.g., by a user) or automatically (e.g., by sustainability server 120).

Examples of recommendations may include:

Networking device under-utilized during non-business hours; consider powering off or shifting some workloads to those hours Edge device is over-consuming power in its data plane; consider moving traffic to another edge device, in the same data center, that is under-utilized.

Teleconferencing application is under-utilized; consider using the teleconferencing application with camera to save on time and travel.

CPU is over-utilized; because video calls with high-definition video settings can translate to high CPU utilization, consider using video optimization for optimal efficiency during video calls.

Power consumption peaks at 10:00 AM, when power costs in City X are highest; consider moving traffic for a backup at a lower-cost time (which may vary based on the destination(s)).

Switch to a different physical interface that is unused.

Reduce or move data plane traffic to a different networking device that performs the same function (e.g., core routing) but is under-utilized with respect to power.

Reduce the number of routes that the networking device is handling in the control plane.

This networking device is part of a return program; schedule pickup via an application or at this link: [link].

This networking device is eligible for remanufacture; see advantages and improvements here: [link].

This networking device could be replaced with a more efficient networking device: [link].

The recommendations, when implemented, may improve the individual sustainability score of the networking device. In addition to suggesting changes, the recommendations may include an indication of how much power consumption would be saved by implementing the change. When extrapolated over thousands of networking devices, the recommendations could save significant power consumption.

Figure 4:
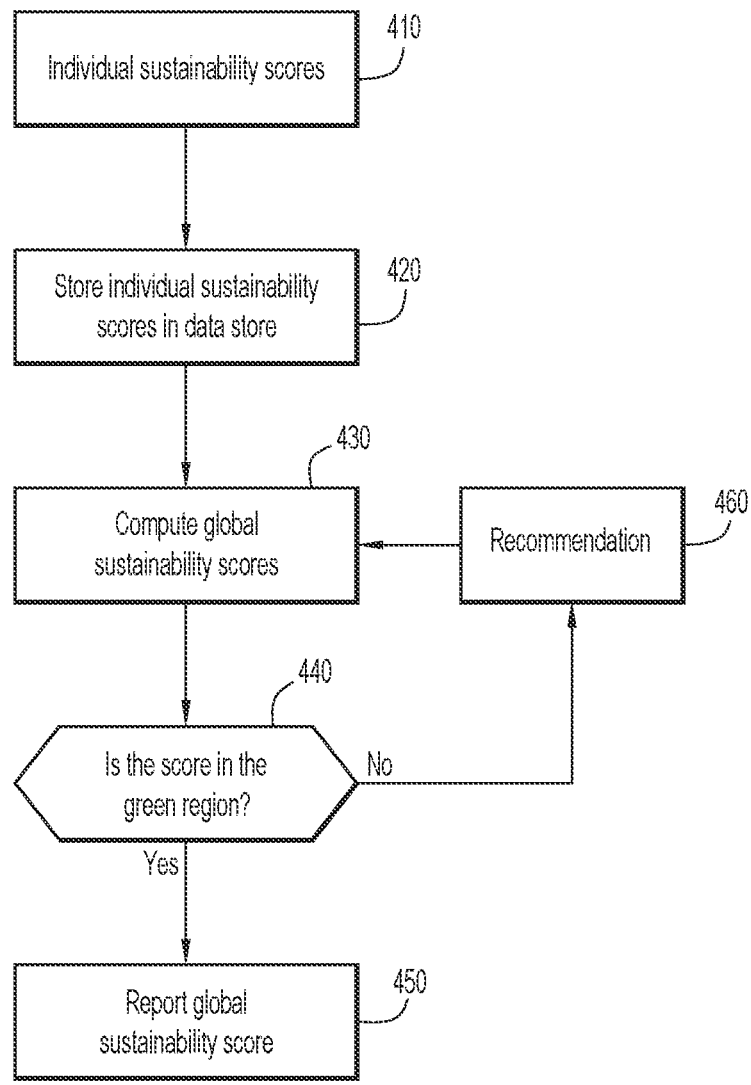
FIG. 4 illustrates a flowchart of a method for computing a global sustainability score that indicates a level of environmental sustainability of a networking system and providing a recommendation to improve the global sustainability score, according to an example embodiment.

With continuing reference to FIG. 1, FIG. 4 illustrates a flowchart of a method 400 for computing a global sustainability score that indicates a level of environmental sustainability of a networking system and providing a recommendation to improve the global sustainability score, according to an example embodiment. At operation 410, sustainability server 120 obtains a plurality of individual sustainability scores each indicating a level of environmental sustainability of a networking device in data center 125 (e.g., firewall/gateway/load-balancer 135, routers 140(1)-140(N), and switches 145(1)-145(M)). In one example, sustainability server 120 may obtain power consumption data of each of the networking devices on a per-plane basis, and, based on the power consumption data, compute each of the individual sustainability scores.

At operation 420, sustainability server 120 stores the individual sustainability scores in a data store. The data store may be local to or remote from sustainability server 120. For example, the data store may be memory that is integrated with sustainability server 120 or in the cloud. At operation 430, based on the individual sustainability score for each networking device of the plurality of networking devices, sustainability server 120 computes a global sustainability score. The global sustainability score may indicate a level of environmental sustainability of networking system 100 (e.g., data center 125).

Because it is computed based on the individual sustainability scores, the global sustainability score may consider the dynamic nature of the sustainability of one or more networking devices in the networking system. The global sustainability score may be a current or predicted global sustainability score. A current global sustainability score may indicate the current level of environmental sustainability of networking system 100. A predicted global sustainability score may indicate a predicted level of environmental sustainability of networking system 100 for some amount of time in the future (e.g., one hour).

Sustainability server 120 may compute the global sustainability score using a Multiple Linear Regression (MLR) model. Sustainability server 120 may compute the global sustainability score (e.g., a dependent variable) from multiple independent variables. In one example, the global sustainability score may equal $A+B1(X1)+B2(X2)+B3(X3)+B4(X4)+\ldots$, where A corresponds to a static component (e.g., the amortized cost of energy spent in manufacturing, shipping, and installation of the networking devices), and Bi is the weighted factor for an independent variable Xi.

Thus, in addition or alternative to the individual sustainability scores, sustainability server 120 may also compute the global sustainability score based on one or more current or assumed factors (e.g., independent variables). The assumed factors may be for an amount of time in the future (e.g., one hour). The factors may include configurations or operating parameters of the networking devices or networking system 100. For example, the factors may include: whether electricity (input power) supplied to data center 125 is provided by a green source; the ages, types, and uses of the networking devices in networking system 100 (e.g., in data center 125); the location (e.g., country) of the networking devices; power consumption per byte; levels of network traffic at different times; time of day/week/month/year/etc.; the circular economy factors (the 5Rs); BU; manufacturing process; global and local regulatory compliances; etc.

At operation 440, sustainability server 120 determines whether the global sustainability score is in a "green region," indicating that networking system 100 is environmentally sustainable. In one example, sustainability server 120 may determine whether the global sustainability score is above or below a given threshold. Sustainability server 120 may analyze the power consumption data for each networking device on a per-plane basis to make the determination.

In response to analyzing the power consumption data for each networking device on the per-plane basis, sustainability server 120 may provide a recommendation to implement a change to a configuration or operating parameter of one or more networking devices of the plurality of networking devices, or to the networking system, to improve the global sustainability score. More specifically, if the global sustainability score is in the green region, at operation 450, sustainability server 120 may report the global sustainability score (e.g., to the user). Or, if the global sustainability score is not in the green region, at operation 460, sustainability server 120 provides a recommendation (e.g., to the user) to implement the assumed factors. Sustainability server 120 may then return to operation 430, where sustainability server 120 may compute another global sustainability score based on a different set of assumed factors.

Sustainability server 120 may continue iterating between operations 430 and 440 until a global sustainability score is determined to be in the green region, at which point, sustainability server 120 may provide a recommendation to implement the corresponding assumed factors. The recommendation may be implemented manually (e.g., by a user) or automatically (e.g., by sustainability server 120). Thus, sustainability server 120 may create a feedback loop to show solution costs at different times of the day to curb and/or reverse any trends of increasing power in certain networking devices and policies.

Though the task of determining sustainability may be complex—particularly for solutions with multiple networking devices, such as data center 125—sustainability server 120 may identify the combinations of networking devices and functions at the appropriate times that will achieve the target global sustainability score (e.g., in the green region). As a result, sustainability server 120 may help implement an environmentally optimal solution. Sustainability server 120 may provide the recommendations before changes to data center 125 are implemented. The recommendations may be provided at the device-level and/or at the system-level. To provide the latest innovations and insights for improved efficiency and utilization, the recommendations may be reviewed and updated regularly.

Figure 5:
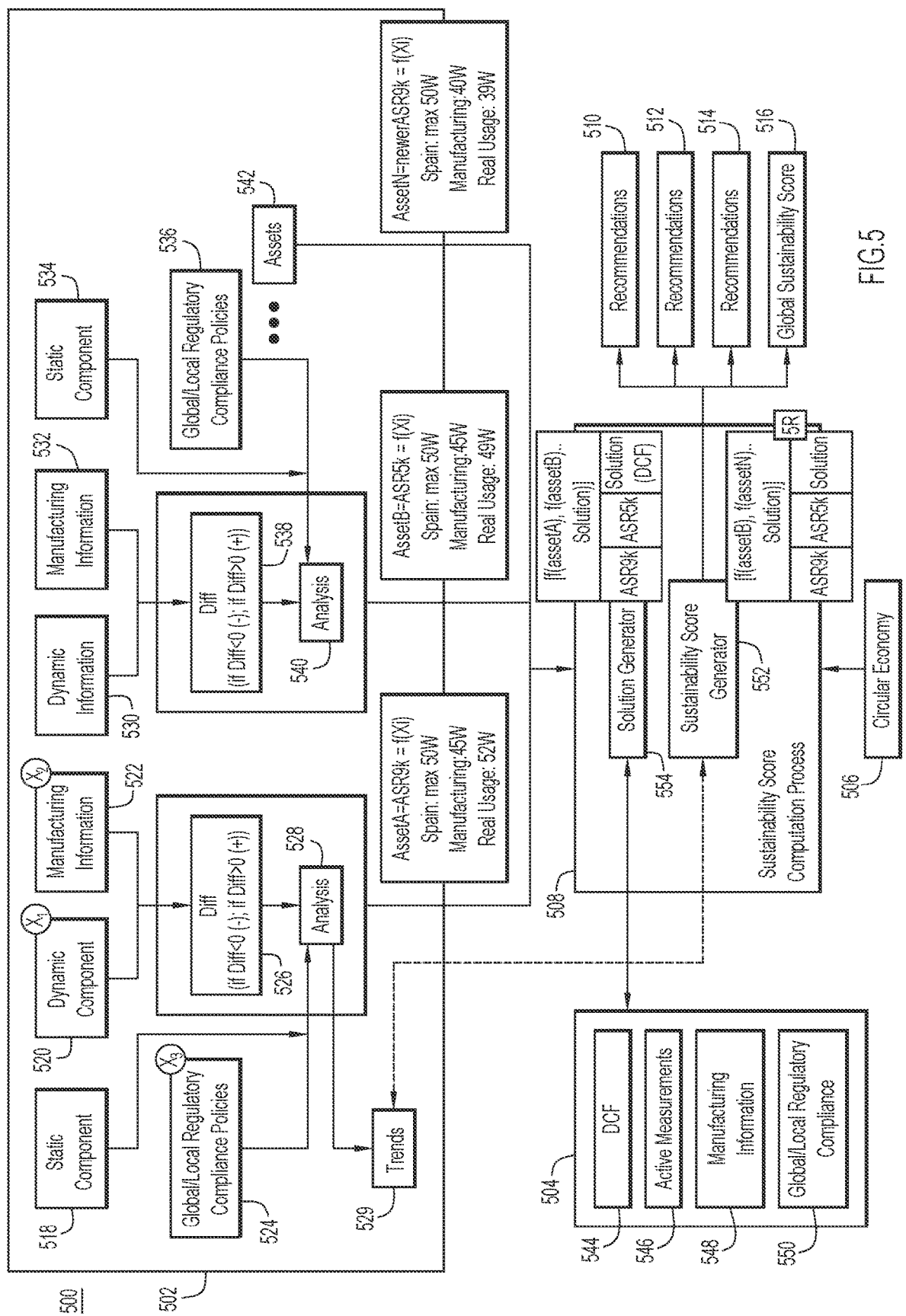
FIG. 5 illustrates a flowchart of a method for improving the environmental sustainability of a networking system, according to an example embodiment.

FIG. 5 illustrates a flowchart of a method 500 for improving the environmental sustainability of a networking system, according to an example embodiment. In one example, method 500 may be performed by sustainability server 120 (FIG. 1). Briefly, factors 502, 504, and 506 may be input into sustainability score computation process 508, which may in turn output individual networking device recommendations 510 and 512, global networking system recommendations 514, and global sustainability score 516. Factors 502 may include (or be based on) device-level assets, factors 504 system-level assets, and factors 506 considerations relating to the circular economy (e.g., the 5Rs).

The device-level assets of factors 502 may be manufactured by one or more vendors, and may include hardware and/or software. For a first networking device, factors 502 may include static component 518, dynamic component 520, manufacturing information 522, and global/local regulatory compliance policies 524. Static component 518 and dynamic component 520 may be similar to the static and dynamic components discussed above. For example, static component 518 may be the amortized power consumed by a manufacturing process, a shipping/transport process, or an installation process for the first networking device. Meanwhile, dynamic component 520 may be the power consumed by the data, control, and management plane components of the first networking device for a given period of time. Manufacturing information 522 may be the rated power of the first networking device.

At operation 526, dynamic component 520 may be compared with manufacturing information 522 to determine the difference between the power consumed by dynamic component 520 and a threshold (e.g., a percentage of the rated power). If the difference is positive (e.g., if the power consumed by dynamic component 520 is greater than the threshold), then at operation 528 an analysis (e.g., a time-series analysis) may be performed on the first networking device. Based on the analysis, trends 529 (e.g., seasonality, traffic conditions, etc.) may be discovered for the first networking device. If the difference is negative (e.g., if the power consumed by dynamic component 520 is less than the threshold), then the analysis may not be performed on the first networking device.

For a second networking device, factors 502 may include dynamic component 530, manufacturing information 532, static component 534, and global/local regulatory compliance policies 536. Static component 534 and dynamic component 530 may be similar to the static and dynamic components discussed above. For example, static component 534 may be the amortized power consumed by a manufacturing process, a shipping/transport process, or an installation process for the second networking device. Meanwhile, dynamic component 530 may be the power consumed by power the data, control, and management plane components of the second networking device for a given period of time. Manufacturing information 532 may be the rated power of the second networking device.

At operation 538, dynamic component 530 may be compared with manufacturing information 532 to determine the difference between the power consumed by dynamic component 530 and a threshold (e.g., a percentage of the rated power). If the difference is positive (e.g., if the power consumed by dynamic component 530 is greater than the threshold), then at operation 540 an analysis (e.g., a time-series analysis) may be performed on the second networking device. If the difference is negative (e.g., if the power consumed by dynamic component 520 is less than the threshold), then the analysis may not be performed on the second networking device.

Factors 502 may include assets relating to any suitable number of networking devices. Assets 542 may represent a static component, dynamic component, manufacturing information, and global/local regulatory compliance policies for an Nth networking device, as well as trends for the Nth networking device. Assets 542 may further include operations similar to operations 526 and 538, and operations 528 and 540, for the Nth networking device.

Sustainability score computation process 508 may obtain certain data from factors 502, such as the type of the networking device, country of the networking device, regulatory compliance policies for the country, the threshold, and the actual/real usage (e.g., power consumed). The first networking device may be an older Cisco® 9000 Series Aggregation Services Router (ASR9k) located in Spain, which may have a regulatory compliance policy dictating a maximum acceptable power consumption of 50 W for the older ASR9k. The threshold for the older ASR9k may be 45 W, and the actual usage for the older ASR9k may be 52 W. The second networking device may be a Cisco® 5000 Series Aggregation Services Router (ASR5k) located in Spain, which may have a regulatory compliance policy dictating a maximum acceptable power consumption of 50 W for the ASR5k. The threshold for the ASR5k may be 45 W, and the actual usage for the ASR5k may be 49 W. The Nth networking device may be a newer ASR9k located in Spain, which may have a regulatory compliance policy dictating a maximum acceptable power consumption of 50 W for the newer ASR9k. The threshold for the newer ASR9k may be 40 W, and the actual usage for the newer ASR9k may be 39 W.

In one example, the first, second, . . . , Nth networking devices may be part of the same networking system (e.g., a data center located in Spain). Accordingly, factors 504 may include (or be based on) system-level assets, such as Data Center Factor (DCF) 544, active measurements 546, manufacturing information 548, and global/local regulatory compliance policies 550. DCF 544 may include the origin—green or otherwise—of power supply to the data center. Active measurements 546 may include measurements per service, routing decisions, etc. Manufacturing information 548 may include information relating to the manufacturing of the data center. Global/local regulatory compliance policies 550 may include policies for the location of the data center.

Sustainability score computation process 508 may include sustainability score generator 552 and solution generator 554. Sustainability score generator 552 may include a system for composing one or more sustainability scores, including individual sustainability scores for the first, second, . . . , Nth networking devices and global sustainability score 516 for the data center. In addition to the individual sustainability scores and global sustainability score 516, sustainability score generator 552 may be configured to output individual networking device recommendations 510 for improving the individual sustainability score of the first networking device, individual networking device recommendations 512 for improving the individual sustainability score of the second networking device, and global networking system recommendations 514 for improving global sustainability score 516. Solution generator 554 may dynamically generate a set of assets (e.g., suggested assets) based on the individual sustainability scores and/or global sustainability score 516.

In one example, sustainability score generator 552 may, in conjunction with solution generator 554, use an MLR model to predict how changes might impact the sustainability of the networking devices and/or data center. For example, if a sustainability score is below or above a threshold or target value, sustainability score generator 552 may identify specific actions that, if taken, would improve (e.g., raise or lower) the sustainability score. Sustainability score generator 552 may identify the specific actions based on the 5Rs such that individual networking device recommendations 510 and 512, and global networking system recommendations 514, are aligned with the circular economy. By incorporating the 5Rs, sustainability score generator 552 may identify an expanded set of options that relate to the concept(s) of refuse, reduce, reuse, repurpose, and/or recycle. This may ultimately lead to financial benefits and improvement of global sustainability score 516.

Sustainability score generator 552 and solution generator 554 may account for any suitable assets corresponding to any suitable number or combination of networking device(s) and/or system(s). For example, sustainability score generator 552 may utilize input based on the second networking device, the Nth networking device, and the data center, whereas solution generator 554 may utilize input based on the first networking device, the second networking device, and the data center.

Figure 6:
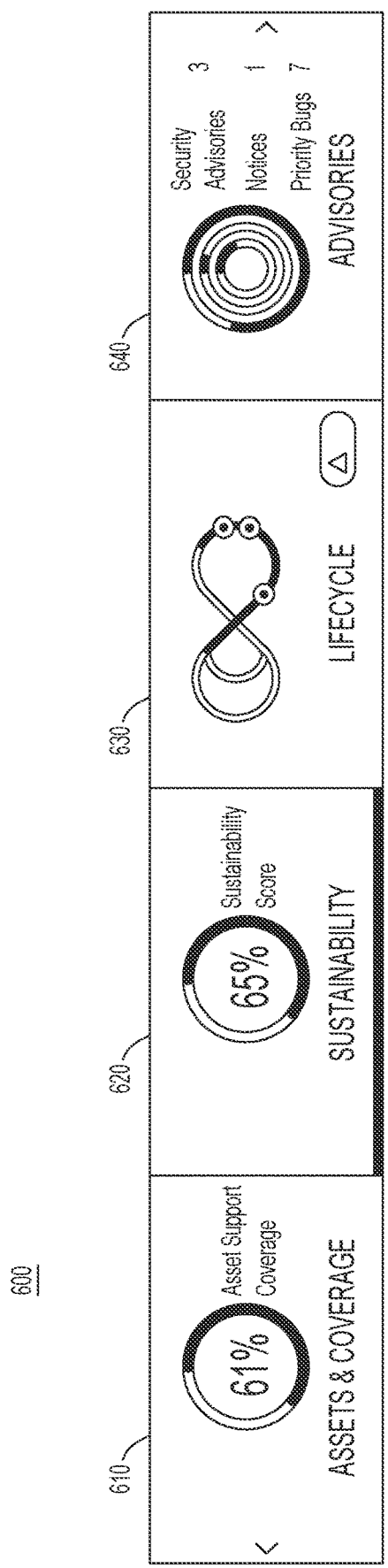
FIG. 6 illustrates a visualization that displays sustainability information relating to a networking system, according to an example embodiment.
Figure 7:
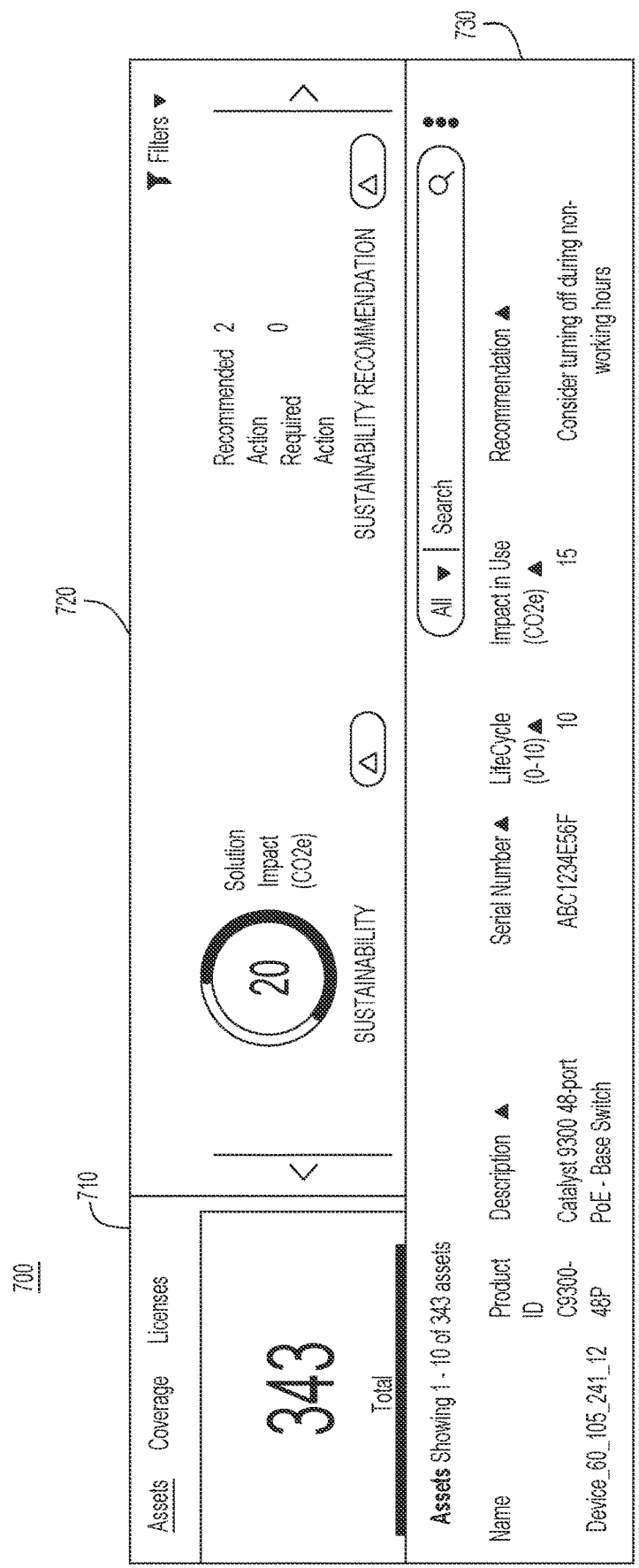
FIG. 7 illustrates a visualization that displays sustainability information relating to a networking device in a networking system, according to an example embodiment.

FIGS. 6 and 7 illustrate visualization 600 and visualization 700, according to an example embodiment. Visualization 600 displays sustainability information relating to a networking system, and visualization 700 displays sustainability information relating to a networking device. Visualizations 600 and 700 may be part of a cloud platform that shares sustainability scores with users and thereby helps network vendors, customers, and partners to achieve sustainable development goals/targets. In one example, the cloud platform may compare sustainability scores of networking devices and systems from different vendors and provide recommendations to improve the environmental footprint of the networking device(s)/system(s).

With specific reference to FIG. 6, visualization 600 displays sustainability information relating to a networking system, according to an example embodiment. Visualization 600 includes assets and coverage window 610, sustainability window 620, lifecycle window 630, and advisories window 640. Assets and coverage window 610 may display a value (e.g., 61%) that represents a level of support that is available for the networking system. Sustainability window 620 may display the global sustainability score of the networking system (e.g., 65%). Lifecycle window 630 may display the lifecycle stage of the networking system. Advisories window 640 may display links to recommendations for improving the global sustainability score of the networking system. In a further example, visualization 600 may also display a predicted global sustainability score that would apply to the networking system if the recommendations are implemented.

FIG. 7 illustrates a visualization 700 that displays sustainability information relating to a networking device in a networking system, according to an example embodiment. Visualization 700 includes assets window 710, sustainability window 720, and detail window 730. Assets window 710 displays the total number of networking devices in the networking system (e.g., 343 networking devices). Sustainability window 720 displays the individual sustainability score (e.g., 20) and a link to the recommendations for improving the individual sustainability score. Detail window 730 displays information about the networking device, such as the networking device name, product identifier, description, serial number, lifecycle rating, environmental impact when in use (measured in $CO_2$ equivalent), and recommendation for improving the individual sustainability score. In this example, the recommendation is to consider turning off the networking device during non-working hours. In a further example, visualization 700 may also display a predicted individual sustainability score that would apply to the networking device if the recommendation is implemented.

Figure 8:
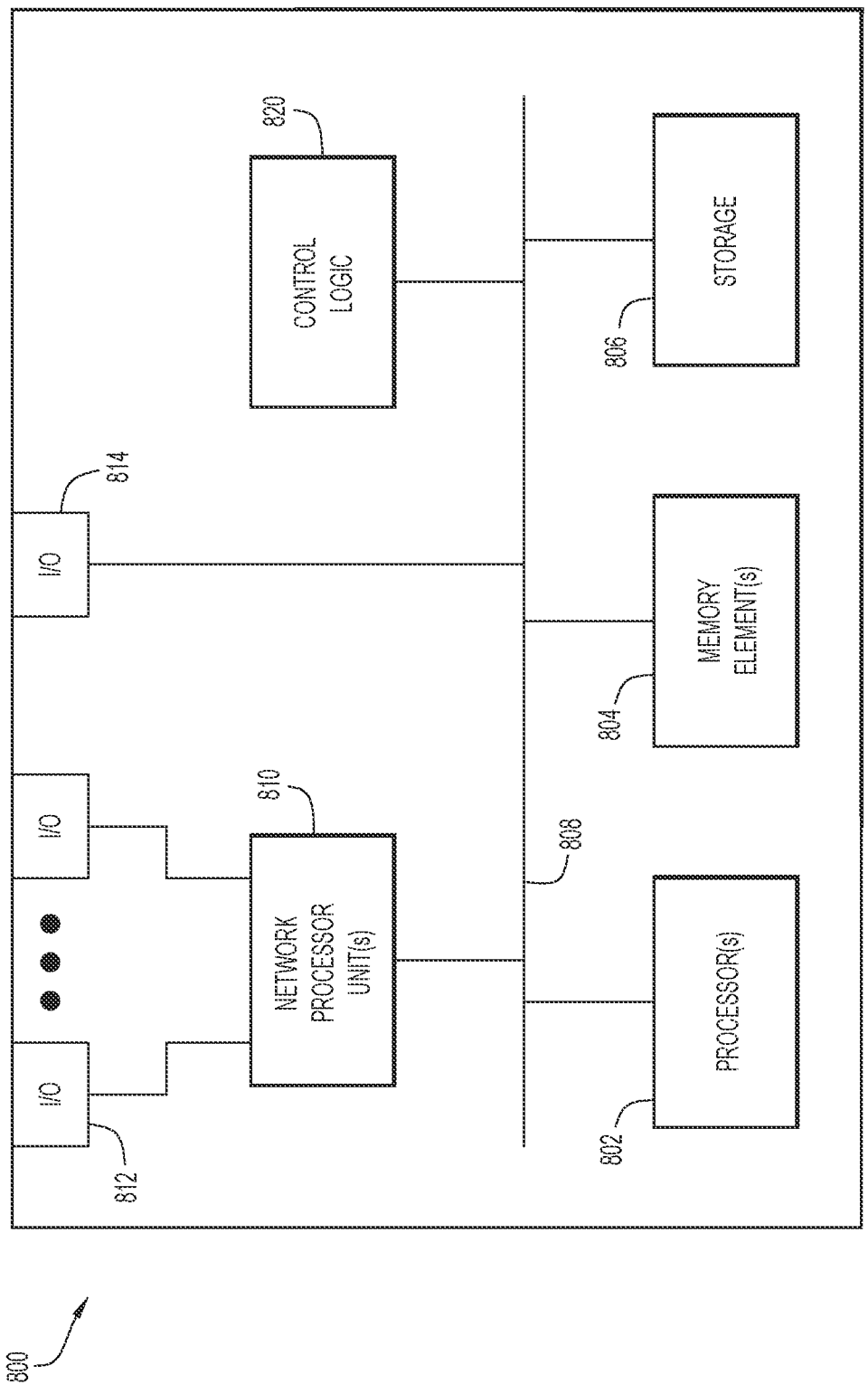
FIG. 8 illustrates a hardware block diagram of a computing device configured to perform functions associated with operations discussed herein, according to an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interfaces 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device 800; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory elements 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 800 for transfer onto another computer readable storage medium.

Figure 9:
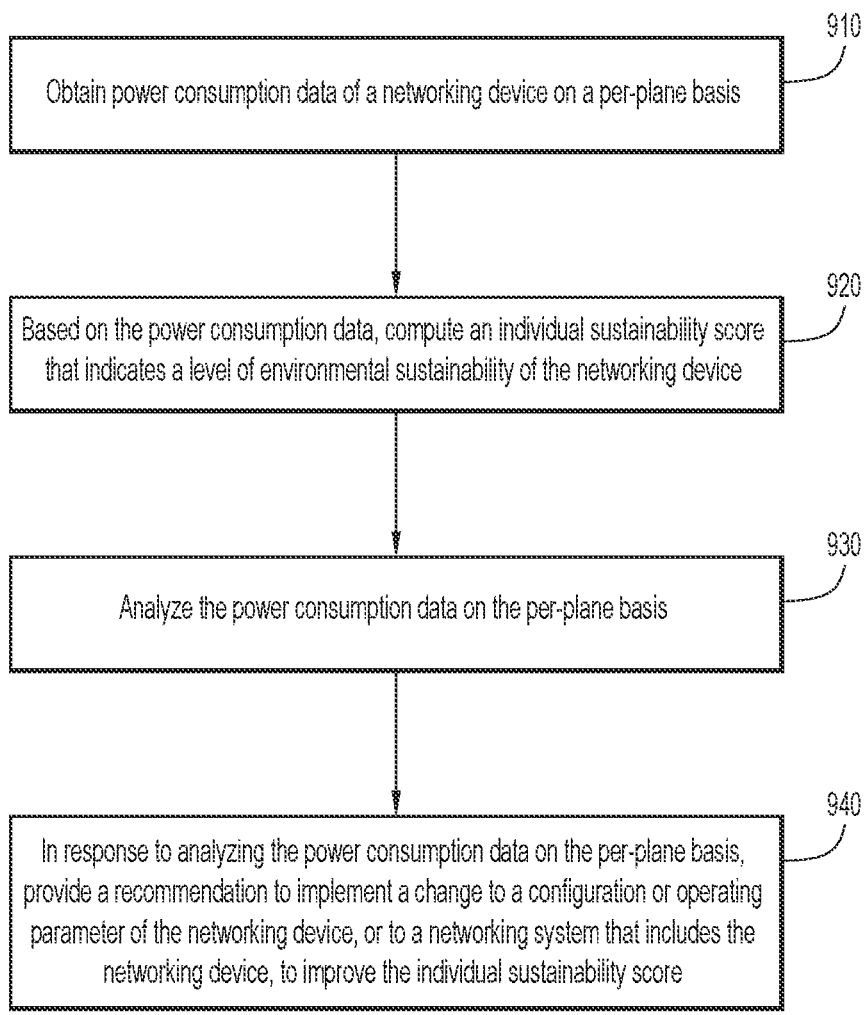
FIG. 9 illustrates a flowchart of a method for performing functions associated with operations discussed herein, according to an example embodiment.

FIG. 9 is a flowchart of an example method 900 for performing functions associated with operations discussed herein. Method 900 may be performed by any suitable entity, such as sustainability server 120 (FIG. 1). At operation 910, sustainability server 120 obtains power consumption data of a networking device on a per-plane basis. At operation 920, based on the power consumption data, sustainability server 120 computes an individual sustainability score that indicates a level of environmental sustainability of the networking device. At operation 930, sustainability server 120 analyzes the power consumption data on the per-plane basis. At operation 940, in response to analyzing the power consumption data on the per-plane basis, sustainability server 120 provides a recommendation to implement a change to a configuration or operating parameter of the networking device, or to a networking system that includes the networking device, to improve the individual sustainability score.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: obtaining power consumption data of a networking device on a per-plane basis; based on the power consumption data, computing an individual sustainability score that indicates a level of environmental sustainability of the networking device; analyzing the power consumption data on the per-plane basis; and in response to analyzing the power consumption data on the per-plane basis, providing a recommendation to implement a change to a configuration or operating parameter of the networking device, or to a networking system that includes the networking device, to improve the individual sustainability score.

In one example, the method further comprises: implementing the change to the configuration or operating parameter of the networking device or to the networking system to improve the individual sustainability score.

In one example, obtaining the power consumption data on the per-plane basis includes obtaining power consumption data of one or more data plane components of the networking device. In a further example, obtaining the power consumption data of the one or more data plane components of the networking device includes obtaining power consumption data of one or more optics components of the networking device.

In one example, obtaining the power consumption data on the per-plane basis includes obtaining power consumption data of one or more control plane components of the networking device.

In one example, obtaining the power consumption data on the per-plane basis includes obtaining power consumption data of one or more management plane components of the networking device.

In one example, the method further comprises: performing the obtaining, the analyzing, and the computing for each networking device of a plurality of networking devices in the networking system; based on the individual sustainability score for each networking device of the plurality of networking devices, computing a global sustainability score that indicates a level of environmental sustainability of the networking system; and in response to analyzing the power consumption data for each networking device on the per-plane basis, providing a recommendation to implement a change to a configuration or operating parameter of one or more networking devices of the plurality of networking devices, or to the networking system, to improve the global sustainability score.

In one example, the method further comprises: computing the individual sustainability score based further on one or more of a manufacturing process, a shipping process, or an installation process for the networking device.

In another form, an apparatus is provided. The apparatus comprises: a network interface configured to obtain or provide network communications; and one or more processors coupled to the network interface, wherein the one or more processors are configured to: obtain power consumption data of a networking device on a per-plane basis; based on the power consumption data, compute an individual sustainability score that indicates a level of environmental sustainability of the networking device; analyze the power consumption data on the per-plane basis; and in response to analyzing the power consumption data on the per-plane basis, provide a recommendation to implement a change to a configuration or operating parameter of the networking device, or to a networking system that includes the networking device, to improve the individual sustainability score.

In another form, one or more non-transitory computer readable storage media are provided. The non-transitory computer readable storage media are encoded with instructions that, when executed by a processor, cause the processor to: obtain power consumption data of a networking device on a per-plane basis; based on the power consumption data, compute an individual sustainability score that indicates a level of environmental sustainability of the networking device; analyze the power consumption data on the per-plane basis; and in response to analyzing the power consumption data on the per-plane basis, provide a recommendation to implement a change to a configuration or operating parameter of the networking device, or to a networking system that includes the networking device, to improve the individual sustainability score.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining power consumption data of a networking device, on a per-plane basis, with respect to one or more data plane components, one or more control plane components, and one or more management plane components of the networking device, respectively;
   based on the power consumption data on the per-plane basis, computing an individual sustainability score that indicates a level of environmental sustainability of the networking device;
   analyzing the power consumption data on the per-plane basis with respect to each of the one or more data plane components, the one or more control plane components, and the one or more management plane components of the networking device; and
   in response to analyzing the power consumption data on the per-plane basis, providing a recommendation to implement a change to a configuration or operating parameter of the networking device, or to a networking system that includes the networking device, to improve the individual sustainability score.

2. The method of claim 1, further comprising:
   controlling the networking device to implement the change to the configuration or operating parameter of the networking device or to the networking system to improve the individual sustainability score.

3. The method of claim 1, wherein obtaining the power consumption data of the one or more data plane components of the networking device includes obtaining power consumption data of one or more optics components of the networking device.

4. The method of claim 1, further comprising:
performing the obtaining, the computing, and the analyzing for each networking device of a plurality of networking devices in the networking system on the per-plane basis;
based on the individual sustainability score for each networking device of the plurality of networking devices, computing a global sustainability score that indicates a level of environmental sustainability of the networking system; and
in response to analyzing the power consumption data for each networking device on the per-plane basis, providing one or more recommendations to implement a change to a configuration or operating parameter of one or more networking devices of the plurality of networking devices, or to the networking system, to improve the global sustainability score.

5. The method of claim 1, further comprising:
computing the individual sustainability score based further on one or more of a manufacturing process, a shipping process, or an installation process for the networking device.

6. The method of claim 1, wherein the analyzing of the power consumption data on the per-plane basis is performed in response to the individual sustainability score exceeding an individual networking device sustainability threshold.

7. The method of claim 1, wherein the analyzing of the power consumption data on the per-plane basis comprises:
performing a time series analysis on telemetry data of the networking device on the per-plane basis with respect to each of the one or more data plane components, the one or more control plane components, and the one or more management plane components of the networking device, respectively,
wherein the time series analysis indicates how the level of environmental sustainability of the networking device changes over time with respect to each of the one or more data plane components, the one or more control plane components, and the one or more management plane components of the networking device.

8. The method of claim 1, wherein the computing of the individual sustainability score that indicates the level of environmental sustainability of the networking device comprises:
dividing the power consumption data of the networking device on the per-plane basis with respect to the one or more data plane components, the one or more control plane components, and the one or more management plane components by an amount of data transmitted and/or received by the one or more data plane components, the one or more control plane components, and the one or more management plane components.

9. The method of claim 1, further comprising:
estimating a future power consumption trend of the networking device based on the analyzing of the power consumption data on the per-plane basis,
wherein the recommendation to implement the change to the configuration or operating parameter of the networking device or to the networking system to improve the individual sustainability score is based on the future power consumption trend of the networking device.

10. The method of claim 1, further comprising:
computing a predicted individual sustainability score that would be obtained if the recommendation to implement the change to the configuration or operating parameter of the networking device or to the networking system is implemented; and
outputting the predicted individual sustainability score along with the recommendation.

11. An apparatus comprising:
a network interface configured to obtain or provide network communications; and
one or more processors coupled to the network interface, wherein the one or more processors are configured to:
obtain power consumption data of a networking device on a per-plane basis, with respect to one or more data plane components, one or more control plane components, and one or more management plane components of the networking device, respectively;
based on the power consumption data on the per-plane basis, compute an individual sustainability score that indicates a level of environmental sustainability of the networking device;
analyze the power consumption data on the per-plane basis with respect to each of the one or more data plane components, the one or more control plane components, and the one or more management plane components of the networking device; and
in response to analyzing the power consumption data on the per-plane basis, provide a recommendation to implement a change to a configuration or operating parameter of the networking device, or to a networking system that includes the networking device, to improve the individual sustainability score.

12. The apparatus of claim 11, wherein the one or more processors are further configured to:
control the networking device to implement the change to the configuration or operating parameter of the networking device or to the networking system to improve the individual sustainability score.

13. The apparatus of claim 11, wherein to obtain the power consumption data of the one or more data plane components, the one or more processors are configured to:
obtain power consumption data of one or more optics components of the networking device.

14. The apparatus of claim 11, wherein the one or more processors are further configured to:
obtain the power consumption data, compute the individual sustainability score, and analyze the power consumption data for each networking device of a plurality of networking devices in the networking system on the per-plane basis;
based on the individual sustainability score for each networking device of the plurality of networking devices, compute a global sustainability score that indicates a level of environmental sustainability of the networking system; and
in response to analyzing the power consumption data for each networking device on the per-plane basis, providing one or more recommendations to implement a change to a configuration or operating parameter of one or more networking devices of the plurality of networking devices, or to the networking system, to improve the global sustainability score.

15. The apparatus of claim 11, wherein the one or more processors are configured to:
compute the individual sustainability score based further on one or more of a manufacturing process, a shipping process, or an installation process for the networking device.

16. One or more non-transitory computer readable storage media encoded with instructions that, when executed by a processor, cause the processor to:
obtain power consumption data of a networking device on a per-plane basis, with respect to one or more data plane components, one or more control plane components, and one or more management plane components of the networking device, respectively;
based on the power consumption data on the per-plane basis, compute an individual sustainability score that indicates a level of environmental sustainability of the networking device;
analyze the power consumption data on the per-plane basis with respect to each of the one or more data plane components, the one or more control plane components, and the one or more management plane components of the networking device; and
in response to analyzing the power consumption data on the per-plane basis, provide a recommendation to implement a change to a configuration or operating parameter of the networking device, or to a networking system that includes the networking device, to improve the individual sustainability score.

17. The one or more non-transitory computer readable storage media of claim 16, wherein the instructions further cause the processor to:
control the networking device to implement the change to the configuration or operating parameter of the networking device or to the networking system to improve the individual sustainability score.

18. The one or more non-transitory computer readable storage media of claim 16, wherein to obtain the power consumption data of the one or more data plane components, the instructions cause the processor to:
obtain power consumption data of one or more optics components of the networking device.

19. The one or more non-transitory computer readable storage media of claim 16, wherein the instructions further cause the processor to:
obtain the power consumption data, compute the individual sustainability score, and analyze the power consumption data for each networking device of a plurality of networking devices in the networking system on the per-plane basis;
based on the individual sustainability score for each networking device of the plurality of networking devices, compute a global sustainability score that indicates a level of environmental sustainability of the networking system; and
in response to analyzing the power consumption data for each networking device on the per-plane basis, providing one or more recommendations to implement a change to a configuration or operating parameter of one or more networking devices of the plurality of networking devices, or to the networking system, to improve the global sustainability score.

20. The one or more non-transitory computer readable storage media of claim 16, wherein the instructions further cause the processor to:
compute the individual sustainability score based further on one or more of a manufacturing process, a shipping process, or an installation process for the networking device.

* * * * *